(12) United States Patent
Dagley et al.

(10) Patent No.: US 11,035,956 B2
(45) Date of Patent: *Jun. 15, 2021

(54) ENHANCED OBJECT TRACKING USING LASER EMITTERS AND SENSORS

(71) Applicant: Capital One Services, LLC, McLean, VA (US)

(72) Inventors: Geoffrey Dagley, McKinney, TX (US); Jason Hoover, Grapevine, TX (US); Stephen Wylie, Carrollton, TX (US); Micah Price, Plano, TX (US); Qiaochu Tang, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 47 days.

This patent is subject to a terminal disclaimer.

(21) Appl. No.: 16/396,239

(22) Filed: Apr. 26, 2019

(65) Prior Publication Data

US 2020/0110178 A1 Apr. 9, 2020

Related U.S. Application Data

(63) Continuation of application No. 16/151,914, filed on Oct. 4, 2018, now Pat. No. 10,324,186.

(51) Int. Cl.
*G01C 3/08* (2006.01)
*G01S 17/48* (2006.01)
*G06Q 30/04* (2012.01)
*H04W 88/08* (2009.01)
*H04W 84/18* (2009.01)

(52) U.S. Cl.
CPC .............. *G01S 17/48* (2013.01); *G06Q 30/04* (2013.01); *H04W 84/18* (2013.01); *H04W 88/08* (2013.01)

(58) Field of Classification Search
CPC ....... G01S 17/48; G06Q 30/04; H04W 64/00; H04W 88/08; H04W 84/18
USPC ......................................................... 356/3.11
See application file for complete search history.

(56) References Cited

U.S. PATENT DOCUMENTS

| 7,342,648 | B2 | 3/2008 | Solomon et al. | |
|---|---|---|---|---|
| 9,644,973 | B2 * | 5/2017 | James | G01C 21/206 |
| 2012/0022826 | A1 * | 1/2012 | Giesekus | G01S 1/70 |
| | | | | 702/150 |
| 2016/0371662 | A1 * | 12/2016 | Fine | G06Q 30/0201 |

OTHER PUBLICATIONS

Buckley, Sean "This Is How Valve's Amazing Lighthouse Tracking Technology Works", Gizmodo [online] May 19, 2015 [retrieved on Apr. 26, 2019]. Retrived from Internet URL: https://gizmodo.com/this-is-how-valve-s-amazing-lighthouse-tracking-technol-1705356768, 8 pages.

* cited by examiner

*Primary Examiner* — Mark Hellner
(74) *Attorney, Agent, or Firm* — Kacvinsky Daisak Bluni PLLC

(57) ABSTRACT

Various embodiments are generally directed to object tracking using laser emitters and sensors. Light emitting devices may emit laser light that is received by sensor devices including photosensors. The sensor devices may determine a location of the respective sensor device based on the received laser light. The sensors devices may form a wireless mesh network that allows each sensor device to transmit the determined location to a base station.

20 Claims, 9 Drawing Sheets

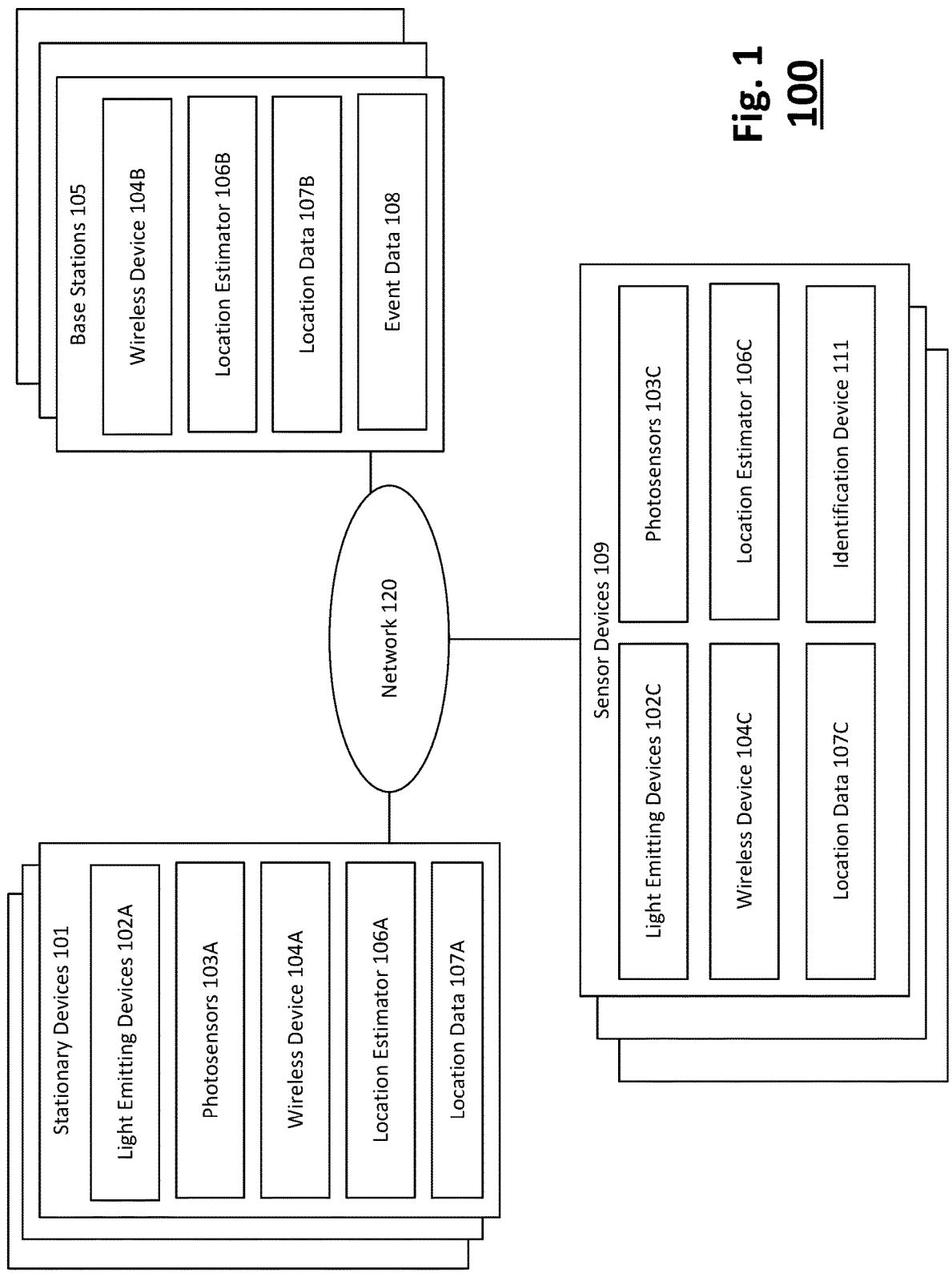

To: Vehicle Owner
From: Base Station Services
Subject: Transaction Receipt

Dear vehicle owner,

Your account has been charged $10 for 35 minutes of parking in location XYZ of parking lot A. Your vehicle entered at 9:00 AM and departed at 9:35 AM. An image of your vehicle (including license plate) entering and leaving the parking lot is attached. The funds will be debited from your account within 1 business day. Please let us know if you have any questions. Thank you for letting us meet your parking needs.

Best regards,

Base Station Services

ENHANCED OBJECT TRACKING USING LASER EMITTERS AND SENSORS

CROSS-REFERENCE TO RELATED APPLICATIONS

This application is a Continuation of U.S. application Ser. No. 16/151,914, filed on Oct. 4, 2018, the disclosure of which is incorporated herein by reference in its entirety.

TECHNICAL FIELD

Embodiments herein generally relate to asset management, and more specifically, to enhanced object tracking using laser emitters and sensors.

BACKGROUND

Asset management conventionally requires significant time and resources to perform manual or partially-automated functions. For example, it is difficult to track the real-time location of objects. This problem is exacerbated when the objects are constantly moving and/or dispersed over large distances. Furthermore, if the location of objects could be accurately determined using automated processes, other asset management functions could be automated to provide greater performance improvements, lower costs, and additional functionality.

BRIEF DESCRIPTION OF THE DRAWINGS

FIG. 1 illustrates an embodiment of a system.

FIG. 3 depicts an exemplary graphical user interface generated based on enhanced object tracking using laser emitters and sensors.

DETAILED DESCRIPTION

Figure 2A:
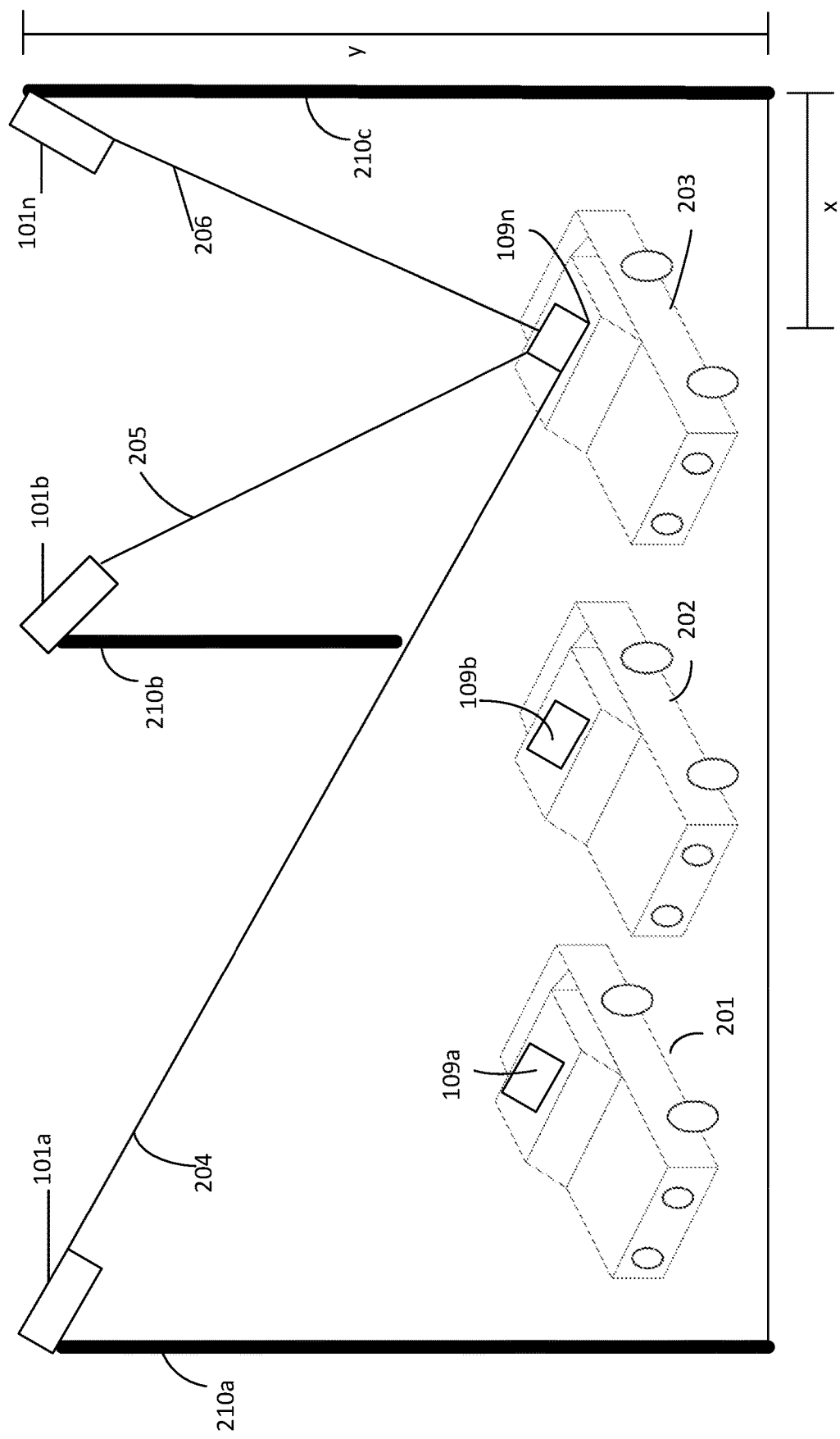
FIGS. 2A-2B illustrate embodiments of enhanced object tracking using laser emitters and sensors.

Embodiments disclosed herein provide techniques to accurately track the location of objects. More specifically, a plurality of light emitting devices may be positioned in known locations. Each light emitting device may emit laser light that can be detected by sensor devices, where one or more sensor devices are associated with objects (e.g., vehicles, shipping containers, items of inventory, etc.). Each light emitting device may further transmit a unique identifier and/or location information encoded in the light. In one embodiment, the unique identifier and/or location information is transmitted using a series of pulses emitted at regular intervals. Photosensors of the sensor devices may detect the light emitted by one or more of the light emitting devices. The sensor devices may determine their respective location based on the detected laser light. For example, a given sensor device may triangulate its location based on the times the photosensors detect laser light emitted by the sensor devices. The sensor devices may then transmit an indication of the determined locations to a central base station using a wireless mesh network, where the wireless mesh network includes the sensor devices. The base station may determine actions associated with the received sensor data and perform one or more operations associated with the determined actions.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a digital computer. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 illustrates an embodiment of a system 100. As shown, the system 100 includes one or more stationary devices 101, one or more base stations 105, and one or more sensor devices 109. Generally, the stationary devices 101 may be positioned in known locations and emit light (e.g., laser beams) at the sensor devices 109. The sensor devices 109 may determine their respective locations based on the light emitted by the stationary devices 101. The stationary devices 101, sensor devices 109, and base stations 105, may form a wireless mesh network 120. The sensor devices 109 may transmit their determined locations to the base stations 105 via the wireless mesh network 120. Doing so allows the locations of objects associated with the sensor devices 109 to be tracked across large distances and in open spaces.

For example, the system 100 may be located in a parking lot (or parking garage), where the stationary devices 101 are in known locations (e.g., mounted on light posts, telephone poles, at entrances, at exits, etc.) and each of the sensor devices 109 are placed on (or affixed to) a respective vehicle. The sensor devices 109 may detect light emitted by the stationary devices 101 to determine the location of each vehicle and transmit an indication of the determined location to the base stations 105. Doing so allows the base stations 105 to monitor the location of each vehicle and perform any number and type of operations based on the locations of each vehicle. For example, the base stations 105 may monitor how long a vehicle has been parked in the parking lot after arriving, determine when the vehicle begins to depart the parking lot, determine a fee associated with the amount of time the vehicle was parked in the lot, and charge the account of the vehicle owner for the determined fee. As another example, the base stations 105 may use the location data of each sensor device 109 to generate graphical user interfaces (GUIs) depicting the parking lot in real-time (e.g., depicting each vehicle in a map of the parking lot). The location data may also be used to generate augmented reality (AR) and/or virtual reality (VR) environments that depict the current state of the parking lot in the AR and/or VR environment.

As shown, the stationary devices 101 illustratively include one or more light emitting devices 102A, one or more photosensors 103A, a wireless device 104A, a location estimator 106A, and a data store of location data 107A. The light emitting devices 102 (including light emitting devices 102A, 102C) are generally configured to emit light at predefined timing intervals. The light emitted by the light emitting devices 102A, 102C may include a unique identifier of each light emitting device 102A, 102C. In one embodiment, the unique identifier comprises a frequency of the emitted light. In some embodiments, the unique identifier is encoded into the emitted light. One example of a light emitting device 102 is a laser configured to emit laser light beams. In one embodiment, the light emitting devices 102A, 102C continuously emit laser light beams according to predefined timing intervals. The photosensors 103 (which include photosensors 103A, 103B) are sensors of light or other electromagnetic radiation. The photosensors 103A of the stationary devices 101 may be configured to detect light emitted by the light emitting devices 102A at the sensor devices 109, at least a portion of which is reflected to the photosensors 103A by the sensor devices 109. Doing so allows the location estimator 106A of the stationary devices 101 to determine the location of a sensor device 109. The wireless devices 104 (which includes wireless devices 104A, 104B, and 104C) is representative of any type of wireless communications device or module, such a Bluetooth® module.

The location estimator 106 (which includes location estimators 106A, 106B, 106C) is representative of hardware, software, and/or a combination thereof that is configured to determine the location of the sensor devices 109. The location estimator 106 may use any techniques to determine the location of the sensor devices 109. For example, in one embodiment, the location estimator 106A of the stationary devices 101 may determine the location of the sensor devices 109 based on a determined amount of time required for laser light emitted by the light emitting device 102A of the stationary device 101 to travel to the sensor device 109 and return back to the photosensors 103A of the stationary devices 101. In one embodiment, the location estimator 106A of the stationary device 101 receives an indication of the identification device 111 of the sensor device 109 when the light is reflected to the stationary device 101. For example, the identification device 111 may be a display which outputs a quick response (QR) code and/or a bar code that uniquely identifies the corresponding sensor device 109. As another example, the identification device 111 may be a radio frequency identifier (RFID) tag that stores a unique identifier for the sensor device 109. The location estimator 106A of the stationary device 101 may then associate the determined location with the unique identifier of the sensor device 109. The location data 107A may include data describing the known locations of the stationary devices 101 as well as any determined locations of the sensor devices 109. The location data 107A may include information indicating the timing intervals by which the light emitting devices 102 emit laser light beams. The stationary devices 101 may transmit the location data 107A to the base stations 105 and/or the sensor devices 109 via the wireless device 104A for storage. More generally, the stationary devices 101, base stations 105, and sensor devices 109 may share some or all of the location data 107 via the network 120.

As shown, the sensor devices 109 illustratively include one or more light emitting devices 102C, one or more photosensors 103C, a wireless device 104C, an instance of the location estimator 106C, a data store of location data 107C, and an identification device 111. In one embodiment, the sensor devices 109 do not include light emitting devices 102C. The photosensors 103C of the sensor devices 109 are configured to detect light emitted by the light emitting devices 102A of the stationary devices 101 and/or light emitting devices 102C other sensor devices 109. In one embodiment, the wireless device 104C of the sensor devices 109 is a Bluetooth low energy (BLE) device, thereby forming a BLE wireless mesh network among the sensor devices 109. The location data 107C of the sensor devices 109 may include an indication of the location of each stationary device 101, as well as information describing the light emission timing intervals for the light emitting devices 102A of the stationary devices 101. The location data 107C may also include location data 107C determined by the location estimator 106C of the corresponding sensor device 109 and location data 107C determined by the location estimator 106C of other sensor devices 109 received via the network 120. In at least one embodiment, the sensor devices 109 are programmed to include an instance of the location data 107C for the given environment (e.g., a parking lot, shipping yard, warehouse, etc.) which provides the location estimator 106C with information describing the location of the stationary devices 101.

The location estimator 106C of the sensor devices 109 may generally determine the location of the sensor device 109 (and/or an object associated with the sensor device 109) based on the light emitted by the light emitting devices 102A of the stationary devices 101. Generally, the photosensors 103C of the sensor devices 109 may detect laser light pulses emitted by the light emitting devices 102A of one or more stationary devices 101. When the photosensors 103C detect light, the photosensors 103C may provide an indication of the time the light is detected. The location estimator 106C may use the time the light is detected to compute the distance between the sensor device 109 and the stationary device 101, e.g., based on one or more of the frequency of the light, the speed of the light, and/or the timing patterns for laser light pulses emitted by the light emitting devices 102A.

When the photosensors 103C detect laser light from two or more stationary devices 101 and/or sensor devices 109, the location estimator 106C may determine the location of the sensor device 109 using triangulation techniques. Generally, triangulation is the process of determining the location of the sensor device 109 by forming triangles from known points. For example, the known points may include the positions of each photosensor 103C on the sensor devices 109 and/or the known location of the stationary devices 101 (and/or other sensor devices 109) specified in the location data 107C. For example, if the photosensors 103C of a first sensor device 109 detect laser light emitted by a first stationary device 101 before detecting laser light emitted by a second stationary device 101, the location estimator 106C may determine that the sensor device 109 is closer to the first stationary device 101 than the second stationary device 101, as the light emitting devices 102A of the stationary devices 101 may be configured to emit pulses of laser light at the same time. More generally, the photosensors 103C and/or the location estimator 106C of a sensor device 109 may determine the frequency of any light detected by the photosensors 103C and extract any unique identifiers of the stationary devices 101 encoded in the light. The location estimator 106C may use the frequency and/or unique identifiers to identify data describing the corresponding stationary device 101 in the location data 107C, which may include location coordinates, light pulse emission timing patterns, and the like. Doing so allows the location estimator 106C to determine the distance of the sensor device 109 to any stationary device 101 from which a photosensor 103C of the sensor device 109 has detected light, which in turn allows the location estimator 106C to determine the location coordinates of the sensor device 109.

In one embodiment, the location estimator 106C may determine location coordinates describing the location of the sensor device 109 in two dimensions based on the determined distances between the sensor device 109 and two of the stationary devices 101. In one embodiment, the location estimator 106C may determine location coordinates describing the location of the sensor device 109 in three dimensions based on the determined distances between the sensor device 109 and three of the stationary devices 101.

In one embodiment, a given stationary device 101 acts a reference point to allow the location estimator 106C to determine the location of the corresponding sensor device 109. In such an embodiment, a given stationary device 101 includes a plurality of light emitting devices 102A, while the sensor devices 109 include a plurality of photosensors 103C. The stationary devices 101 may include a first group of light emitting devices 102A that pulse light at the same predefined timing intervals, and a second group of one or more light emitting devices 102A that spin to continuously emit a beam of laser light. When a photosensor 103C of a sensor device 109 detects a flash of light from the first group of light emitting devices 102, the location estimator 106C may determine a time until a photosensor 103C of the sensor device 109 detects the sweeping laser beam from the second group of light emitting devices 102A. The location estimator 106 may then determine the location of the sensor device 109 based on the determined time and a respective location of each photosensor 103C on the sensor device 109. For example, using the determined time and the locations of two photo sensors 103C on the sensor device 109, the location estimator 106C may triangulate the location of the sensor device 109.

Regardless of the techniques used to determine location, the sensor device 109 may transmit an indication of the location determined by the location estimator 106C to the base station 105 via the network 120. In one embodiment, the sensor device 109 transmits the determined location directly to the base station 105 via the network 120. In other embodiments, the location data may "hop" through one or more other sensor devices 109 in the wireless network 120 between the sensor device 109 and the base station 105. In at least one embodiment, the location estimator 106C includes an indication of a unique identifier of an object associated with the corresponding sensor device 109. For example, the unique identifier may be received from the identification device 111 of the sensor device 109. Example unique identifiers stored in the identification device 111 include vehicle identification numbers (VIN), license plate numbers, account numbers, alphanumeric character strings, and the like. Doing so allows the base station 105 and/or other sensor devices 109 to uniquely identify the objects associated with a given sensor device 109.

As shown, the base stations 105 illustratively include a wireless device 104B, an instance of the location estimator 106B, a data store of location data 107B, and a data store of event data 108. The location estimator 106B may determine the location of one or more sensor devices 109 based on data received from the sensor devices 109 and the known location of the stationary devices 101 specified in the location data 107B. In some embodiments, the sensor devices 109 provide the location estimator 106B with raw data received by the photosensors 103C. For example, the sensor devices 109 may provide times that the photosensors 103C detect light, an indication of the identifier in the identified light (e.g., the frequency, a detected series of pulses of light, and/or a unique identifier encoded in the light). Using the received data, the location estimator 106B may determine the location of the sensor devices 109 without requiring the sensor devices 109 to determine their own locations.

The event data 108 generally includes, without limitation, data specifying events, actions, and/or operations associated with the locations of each sensor device 109 in the system 100. For example, the event data 108 may include fee schedules, location data ranges, communication templates, graphical user interface templates, and the like. For example, the sensor devices 109 may be wearable devices provided to users at a concert venue which includes a premium seating area. If a given user enters the premium seating area, the base station 105 may determine the location of the sensor device 109 as described above, and determine that the location of the sensor device 109 is within a location data range of the premium seating area specified in the event data 108. The base station 105 may then determine the fee associated with the premium seating area and charge the user's account for the associated fee. In one embodiment, the base station 105 may process payment for the fee. The base station 105 may further generate and transmit an email (or other communication) to the user's email address. The email may include a detailed receipt describing the associated charges and any payments received. In one embodiment, the sensor devices 109 include an instance of the event data 108. In such embodiments, the sensor devices 109 may perform actions based on the locations determined by the location estimator 106C.

Figure 2B:
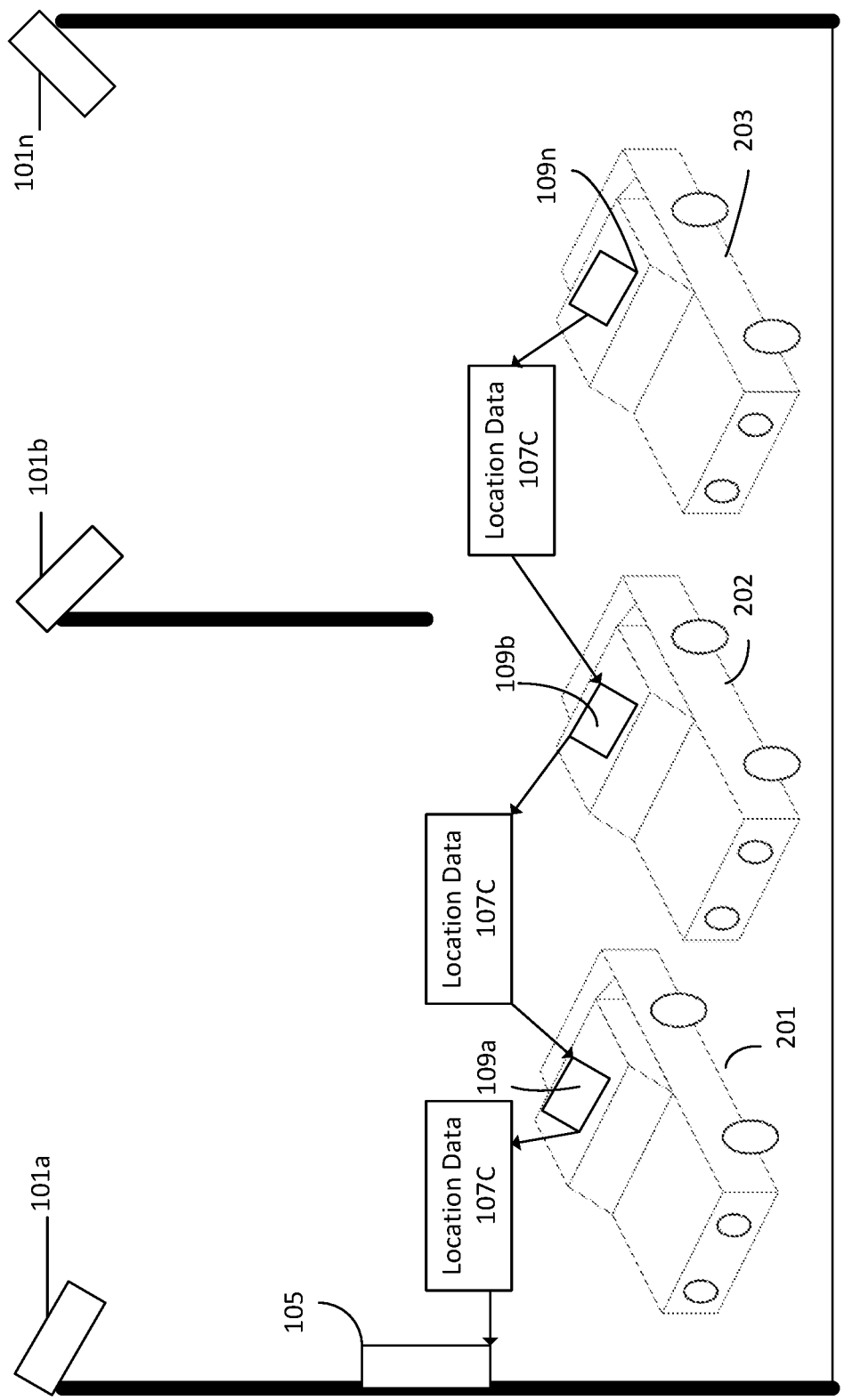

FIG. 2A is a schematic 200 illustrating an embodiment of enhanced object tracking using laser emitters and sensors. As shown, the schematic 200 depicts three stationary devices 101a, 101b, and 101n mounted on support structures 210a, 210b, and 210n, respectively. The schematic 200 further depicts three vehicles 201-203 upon which a sensor device 109a, 109b, 109n, respectively, is disposed (or affixed or integrated). In FIGS. 2A-2B "a", "b", and "n" are any positive integer. Although the sensor devices 109a,b,n are depicted as being mounted on top of the corresponding vehicle, the sensor devices 109a,b,n may be located on any exposed surface of the vehicles 201-203.

FIG. 2A depicts an embodiment where the location of sensor device 109n (and vehicle 203, by association) is determined. Generally, one or more light emitting devices 102A (not pictured) of the stationary devices 101a,b,n emit laser light beams 204-206, respectively. The laser beams 204-206 are representative of any number and type of laser light beams. The photosensors 103C (not pictured) of sensor devices 109a,b,n, may detect the laser beams 204-206. For example, the photosensors 103C may first detect laser beam 206, followed by laser beam 205, and finally laser beam 204. The photosensors 103C may provide, to the location estimator 106C, an indication of the exact time each of the laser beams 204-206 are detected. The location estimator 106C may then determine the location of sensor device 109n based at least in part on the detection times as described above.

As stated, the location estimator 106C may use the known locations of the stationary devices 101a,b,n specified in the location data 107C to determine the location of the sensor device 109n as described above. For example, the location data 107C may specify the location (in x, y, and z coordinates) of each of the stationary devices 101a,b,n. The location estimator 106C may then use the location data 107C and the detection times of the laser beams 204-206 to determine the distance to each stationary device 101a,b,n, and triangulate the location of sensor device 109n. The location estimator 106C may then generate data describing the location of sensor device 109n in three dimensions (e.g., in x, y, and z coordinates).

Further still, the location estimator 106C of sensor device 109n may use data received from the sensor devices 109a,b to modify the determined location. For example, the location estimator 106C may initially determine that sensor 109n (and therefore vehicle 203) is located between vehicles 201 and 202. However, sensor 109n may receive data from sensors 109a,b indicating that sensors 109a,b (and therefore vehicles 201-202) are located on the same side relative to sensor 109n (e.g., the left when looking at FIG. 2A). For example, sensor 109n may receive (x, y, z) coordinates for sensor 109a via the wireless device 104C, and detect light emitted by the light emitting device 102C of sensor device 109b. In such an example, the (x, y, z) coordinates and the emitted light may indicate that sensor devices 109a,b are located in the same direction relative to sensor device 109n. As such, the location estimator 106C of sensor device 109n may modify the initially determined location to more accurately reflect the location of sensor device 109n. For example, the location estimator 106C of sensor device 109n may generate (x, y, z) coordinates for sensor device 109n reflecting that sensor device 109n is to the right (when looking at FIG. 2A) of sensor devices 109a,b.

FIG. 2B is a schematic 210 illustrating an embodiment where the sensor device 109n transmits location data 107C to a base station 105. The location data 107C may reflect some or all of the location data 107C stored in the sensor device 109n. However, the location data 107C includes data describing the location of sensor device 109n. In one embodiment, the location data 107C includes the (x, y, z) coordinates of sensor device 109n determined by location estimator 106C. Additionally and/or alternatively, the location data 107C may include data received by the sensor device 109n which allows the base station 105 to compute the location of sensor device 109n. For example, in such an embodiment, the location data 107C may include the times the laser beams 204-206 were received by one or more photosensors of sensor device 109n, the frequency of the light, and/or any unique identifier encoded in the light. The location data 107C may further include an indication of the unique identifier of the identification device 111 of the sensor device 109n. In this example, the unique identifier may include the VIN of the vehicle 203, a license plate number of the vehicle 203, etc.

As shown, the sensor device 109n transmits the location data 107C to sensor device 109b of vehicle 202, which in turn transmits the received location data 107C to sensor device 109a, which in turn transmits the received location data 107C to the base station 105. As stated, the sensor devices 109n may communicate the location data using the respective wireless devices 104C. In some embodiments, the sensor device 109n transmits the location data 107C directly to base station 105, such as when the sensor device 109n is within a wireless (e.g., BLE) communications range with the base station 105.

FIG. 3 depicts an exemplary GUI 300 generated by the base station 105 based on location data 107C received from a sensor device 109. For example, location data 107C received from sensor device 109n may indicate that vehicle 203 is exiting the parking area. When the location data 107C indicates that the vehicle 203 is moving after being stationary for some period of time, the detected movement may trigger an event specified in the event data 108 (e.g., to compute a fee, charge the account of the user, process payment, and generate an email). In response, the base station 105 may reference the event data 108 to determine a fee schedule for the parking area. The received location data 107C allows the base station 105 to precisely determine when the vehicle 203 entered and exited the parking area. Therefore, the base station 105 may determine how long the vehicle 203 was parked in the parking area based on the received location data 107C of sensor device 109n. The base station 105 may then compute a fee for the vehicle 203 and charge the fee to the account of the user. The base station 105 may then generate the GUI 300, which may also be sent to a device of the user (e.g., via email).

Figure 4:
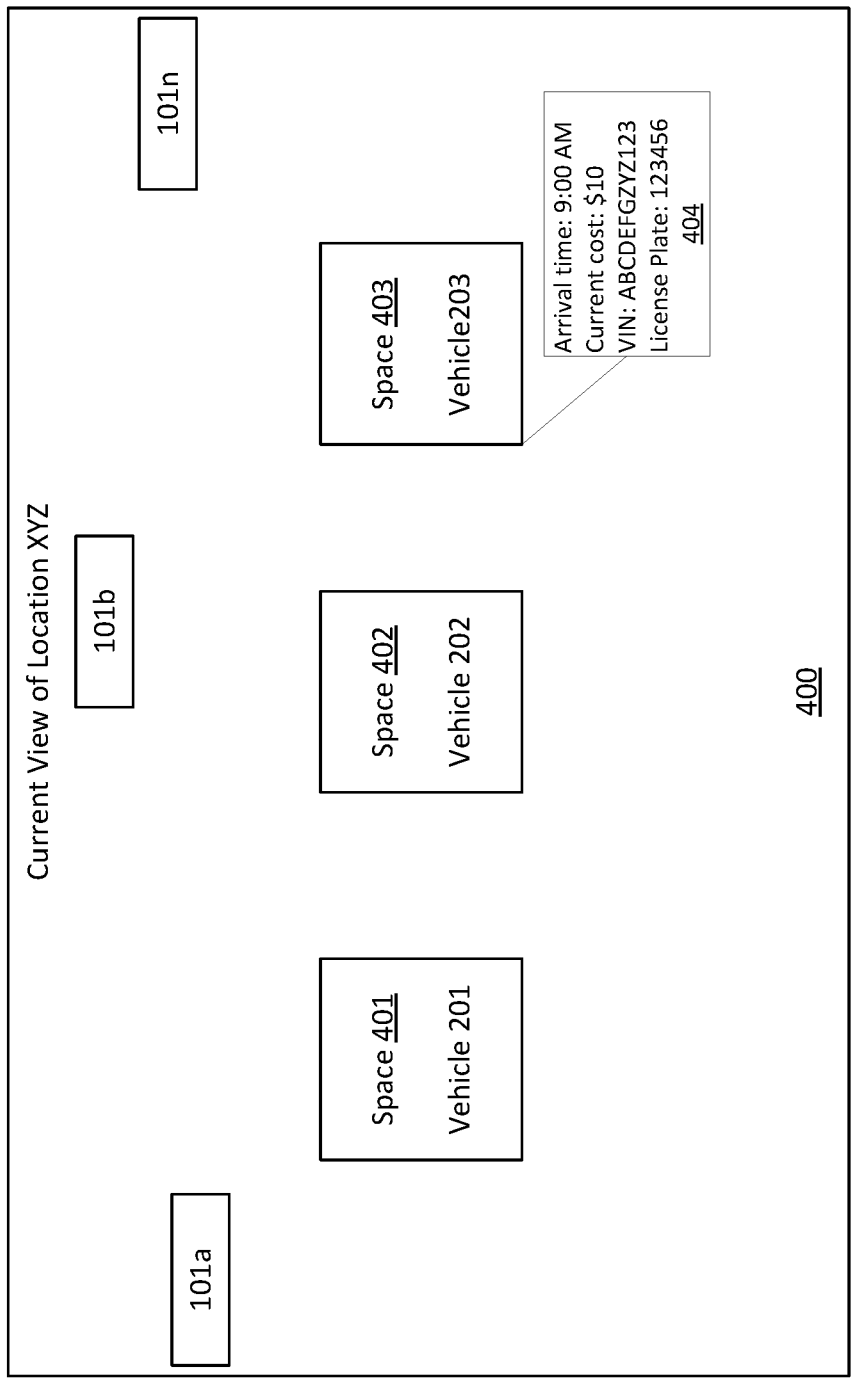
FIG. 4 depicts an exemplary graphical user interface generated based on enhanced object tracking using laser emitters and sensors.

FIG. 4 depicts an exemplary GUI 400 generated by the base station 105 based on enhanced object tracking using laser emitters and sensors. As shown, the GUI 400 depicts a state of the objects in the parking area of FIGS. 2A-2B. More specifically, the GUI 400 depicts the locations of the stationary devices 101a,b,n, and the vehicles 201-203 (e.g., based on the locations of the sensor devices 109a,b,n determined by the location estimator 106C). As shown, the GUI 400 further depicts specific parking spaces 401-403 where the vehicles 201-203 are parked. Furthermore, a GUI popup element 404 shows additional real-time data describing vehicle 203 when a user selects the vehicle 203 (e.g., using a mouse or touchscreen input). In one embodiment, the GUI 400 is part of an AR and/or VR experience, allowing the user to view the parking area in three-dimensions in AR and/or VR. In such embodiments, the user may view the GUI 400 via hardware (e.g., a head-mounted optical display) allowing the user to be immersed in the AR and/or VR experience.

Figure 5:
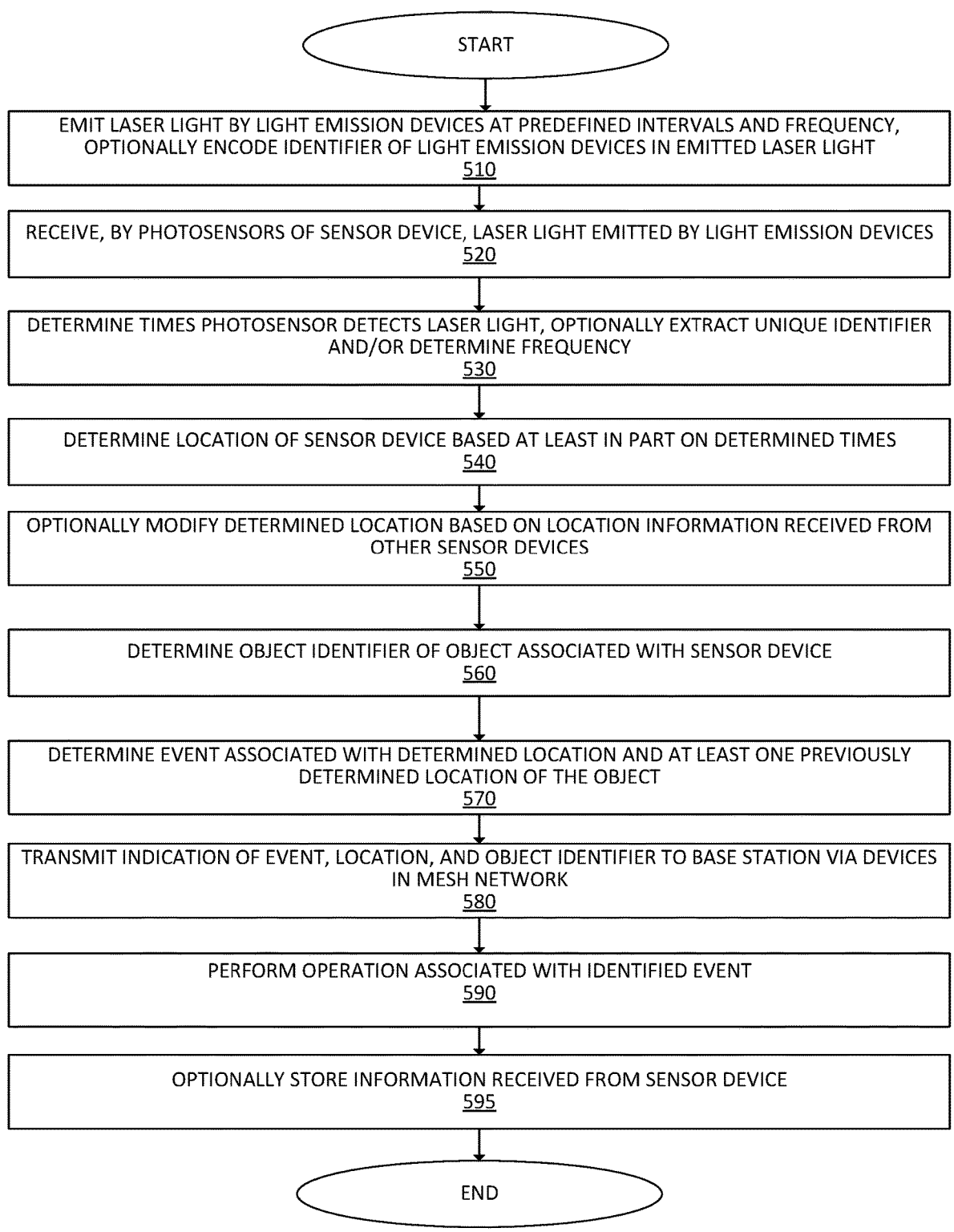
FIG. 5 illustrates an embodiment of a first logic flow.

FIG. 5 illustrates an embodiment of a logic flow 500. The logic flow 500 may be representative of some or all of the operations executed by one or more embodiments described herein. Embodiments are not limited in this context.

In the illustrated embodiment shown in FIG. 5, the logic flow 500 may begin at block 510. At block 510, the light emitting devices 102A may be configured to emit beams of laser light at predefined timing intervals (e.g., to emit pulses). The light beams may be of a predefined frequency associated with a given light emitting device 102A (or the corresponding stationary device 101). The light beams may further encode a unique identifier associated with a given light emitting device 102A (or the corresponding stationary device 101). As stated, the light emitting devices 102C of the sensor devices 109 may also emit beams of laser light. At block 520, one or more photosensors 103C of a sensor device 109 detects laser light emitted by the light emitting devices 102A (and/or 102C). At block 530, the photosensors 103C may determine a time the light is detected at block 520.

Furthermore, the photosensors 103C and/or the location estimator 106C may optionally extract a unique identifier of the light emitting devices 102A, 102C encoded in the light. The photosensors 103C and/or the location estimator 106C may further determine the frequency of the detected light. Doing so allows the location estimator 106C to reference the location data 107C to receive data describing the location and/or other attributes of the stationary devices 101.

At block 540, the location estimator 106C determines the location of the sensor device 109 based at least in part on the time the laser light is detected by the photosensors 103C. For example, the location estimator 106C may determine the amount of time required for the light to travel from the light emitting devices 102A to the photosensors 103C. Doing so allows the location estimator 106C to determine the distance between the light emitting devices 102A and the photosensors 103C. By determining the distance to each light emitting device 102A from which the photosensors 103C detect light, the location estimator 106C may triangulate location coordinates of the sensor device 109.

At block 550, the location estimator 106C may optionally modify the location determined at block 540 based on location information received from other sensor devices 109. For example, the location estimator 106C may receive location data 107C from other sensor devices 109. Additionally and/or alternatively, the location estimator 106C may receive indications of light emitted by a different sensor device 109 which is detected by the photosensors of the sensor device 109. Doing so allows the location estimator 106C to refine the location determined at block 540. At block 560, the sensor device 109 determines an object identifier of an object associated with the sensor device 109. For example, the sensor device 109 may be affixed to a shipping container identified a unique alphanumeric sequence. As another example, the sensor device 109 may be affixed to a vehicle (e.g., car, boat, truck, etc.), and the VIN of the vehicle is the unique identifier. As yet another example, the sensor device 109 may be a wearable device that is linked to a user identifier (e.g., an account number, etc.).

At block 570, the sensor device 109 determines an event specified in the event data 108 based on the location determined at block 550 (and/or block 540) and at least one previously determined location of the sensor device 109. For example, a product associated with a sensor device 109 may sit stationary on a shelf for some period of time and may then be picked up and taken by a shopper for purchase. In response to the product being picked up for purchase, the sensor device 109 may determine to charge the shopper's account for purchasing the item. At block 580, the sensor device 109 transmits an indication of the determined event, the determined location (e.g., location data 107C) of the sensor device 109, and the determined object identifier to the base station 105 via the wireless device 104C over the network 120. As stated, the network 120 may be a wireless mesh network (e.g., a BLE mesh network), and the sensor devices 109 may transmit the data to the base station 105 via the wireless mesh network 120 (e.g., with zero, one, or more sensor devices 109 serving to relay the data to the base station 105). At block 590, the base station 105 and/or the sensor device 109 may perform an operation associated with the event. For example, the base station 105 and/or the sensor device 109 may charge the shopper's account for purchasing the item, and transmit an email including a receipt for the transaction. At block 595, the base station 105 optionally stores the data received from the sensor device 109 for later use.

Figure 6:
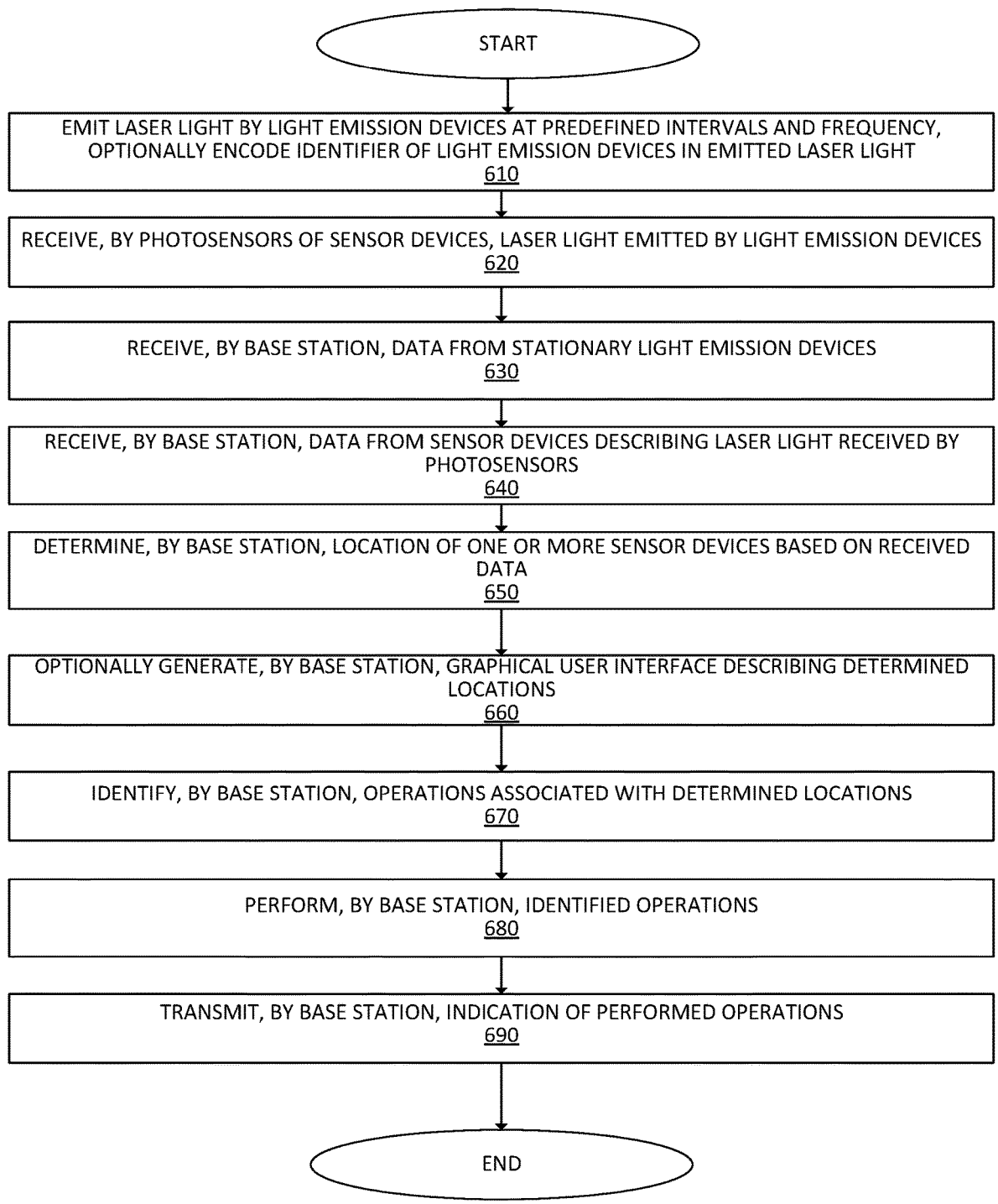
FIG. 6 illustrates an embodiment of a second logic flow.

FIG. 6 illustrates an embodiment of a logic flow 500. The logic flow 600 may be representative of some or all of the operations executed by one or more embodiments described herein. Embodiments are not limited in this context.

In the illustrated embodiment shown in FIG. 6, the logic flow 600 may begin at block 610. At block 610, the light emitting devices 102A may be configured to emit beams of laser light at predefined timing intervals (e.g., to emit pulses). The light beams may be of a predefined frequency associated with a given light emitting device 102A (or the corresponding stationary device 101). The light beams may further encode a unique identifier associated with a given light emitting device 102A (or the corresponding stationary device 101). As stated, the light emitting devices 102C of the sensor devices 109 may also emit beams of laser light. At block 620, one or more photosensors 103C of one or more sensor devices 109 detect laser light emitted by the light emitting devices 102A (and/or 102C). At block 630, the base station 105 receives data from the stationary devices 101. For example, the base station 105 may receive location data 107A from the stationary devices 101 via the network 120. The received location data 107A may specify a location of each stationary device 101 and/or locations of any sensor devices 109 detected by the stationary devices 101. In at least one embodiment, however, the location data 107B of the base station 105 is pre-programmed to include data describing the locations of each stationary device 101.

At block 640, the base station 105 may receive data from the sensor devices 109 via the network 120. For example, the data may include data describing the light detected by the photosensors 103C at block 620. The data may include, without limitation, a time the light was detected by the photosensors 103C, a frequency of the light, and a unique identifier encoded in the light. At block 650, the location estimator 106B of the base station 105 may determine the location of one or more sensor devices 109 based on the received data. Generally, the location estimator 106B may determine the distance between the stationary devices 101 and the sensor devices 109 based on the received times indicating when the photosensors 103C detected light. The location estimator 106B may then triangulate the location of each sensor device 109. As stated, the location estimator 106B may further modify the determined location of each sensor device 109, e.g., based on data received from other sensor devices 109 and/or the stationary devices 101.

At block 660, the base station 105 may optionally generate a GUI describing the determined locations of each sensor device 109. An example of such a GUI is depicted in FIG. 4. Generally, the GUI may accurately depict the determined locations of any sensor devices 109, stationary devices 101, and base stations 105. As stated, the GUI may be part of an AR and/or VR environment. At block 670, the base station 105 may determine, based at least in part on the event data 108, an operation associated with the location of the sensor devices 109 determined at block 650. For example, the event data 108 may specify to update an inventory database when a customer purchases an item having a sensor device 109 affixed to it. As another example, the event data 108 may specify to order additional items if the total count of such items goes below a threshold after the customer purchases the item. At block 680, the base station 105 performs (and/or causes performance of) the operations identified at block 670. At block 690, the base station 105 may transmit an indication of the performed operations. For example, the base station 105 may generate and transmit an email receipt, push a smartphone notification, and the like.

Figure 7:
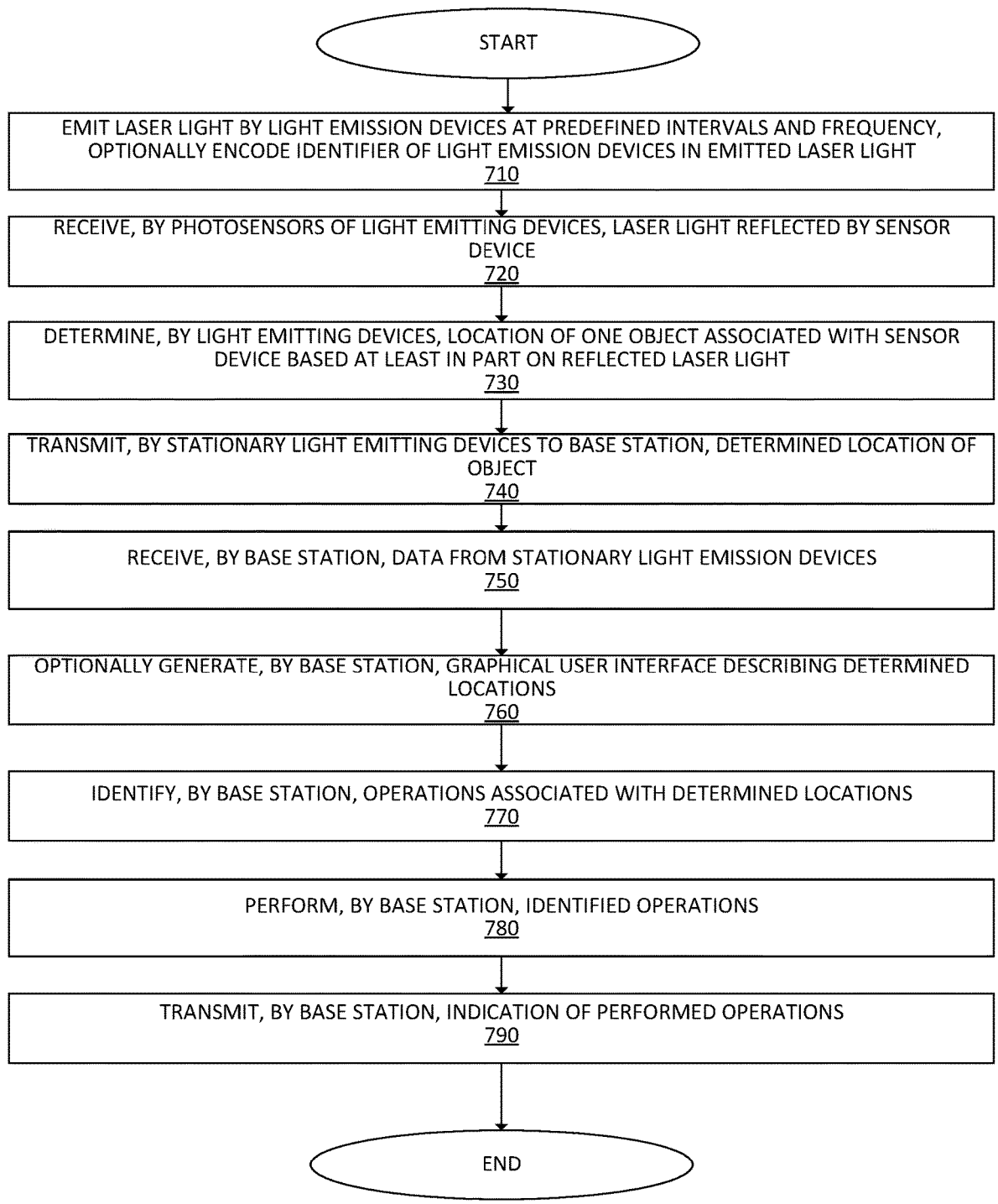
FIG. 7 illustrates an embodiment of a third logic flow.

FIG. 7 illustrates an embodiment of a logic flow 700. The logic flow 700 may be representative of some or all of the operations executed by one or more embodiments described herein. Embodiments are not limited in this context.

In the illustrated embodiment shown in FIG. 7, the logic flow 700 may begin at block 710. At block 710, the light emitting devices 102A may be configured to emit beams of laser light at predefined timing intervals (e.g., to emit pulses). The light beams may be of a predefined frequency associated with a given light emitting device 102A (or the corresponding stationary device 101). The light beams may further encode a unique identifier associated with a given light emitting device 102A (or the corresponding stationary device 101). As stated, the light emitting devices 102C of the sensor devices 109 may also emit beams of laser light.

At block 720, the photosensors 103A of a stationary device 101 detect at least a portion of the laser light beam emitted at block 710 that is reflected to the stationary device 101 by a sensor device 109. The photosensors 103A may further identify a unique identifier stored in the identification device 111 of the sensor device. At block 730, the location estimator 106A of the stationary device 101 may determine the location of the sensor devices 109. Generally, the location estimator 106A may determine the distance between the stationary device 101 and the sensor device 109 based on a determined amount of time between when the light is emitted at block 710 and the reflected light is detected at block 720. Based on the determined amount of time, the location estimator 106A may determine the distance to the sensor device 109. Based on the height of the stationary device 101, the angle at which the stationary device 101 emits light, and the determined distance to the sensor device 109, the location estimator 106A may compute the location of the sensor device 109.

At block 740, the stationary device 101 may then transmit the determined location to a base station 105. At block 750, the base station 105 receives the location data from the stationary device 101 via the network 120. At block 760, the base station 105 may optionally generate a GUI describing the locations of each sensor device 109 determined by the location estimator 106A of the stationary devices 101. As stated, the GUI may accurately depict the determined locations of any sensor devices 109, stationary devices 101, and base stations 105, and the GUI may be part of an AR and/or VR environment. At block 770, the base station 105 may determine, based at least in part on the event data 108, an operation associated with the location of the sensor devices 109 determined by the stationary devices 101 at block 730. For example, the event data 108 may trigger an automated inventory management system to retrieve an object associated with the sensor device 109. At block 780, the base station 105 performs (and/or causes performance of) the operations identified at block 770. At block 790, the base station 105 may transmit an indication of the performed operations. For example, as stated, the base station 105 may generate and transmit an email receipt, push a smartphone notification, and the like.

Figure 8:
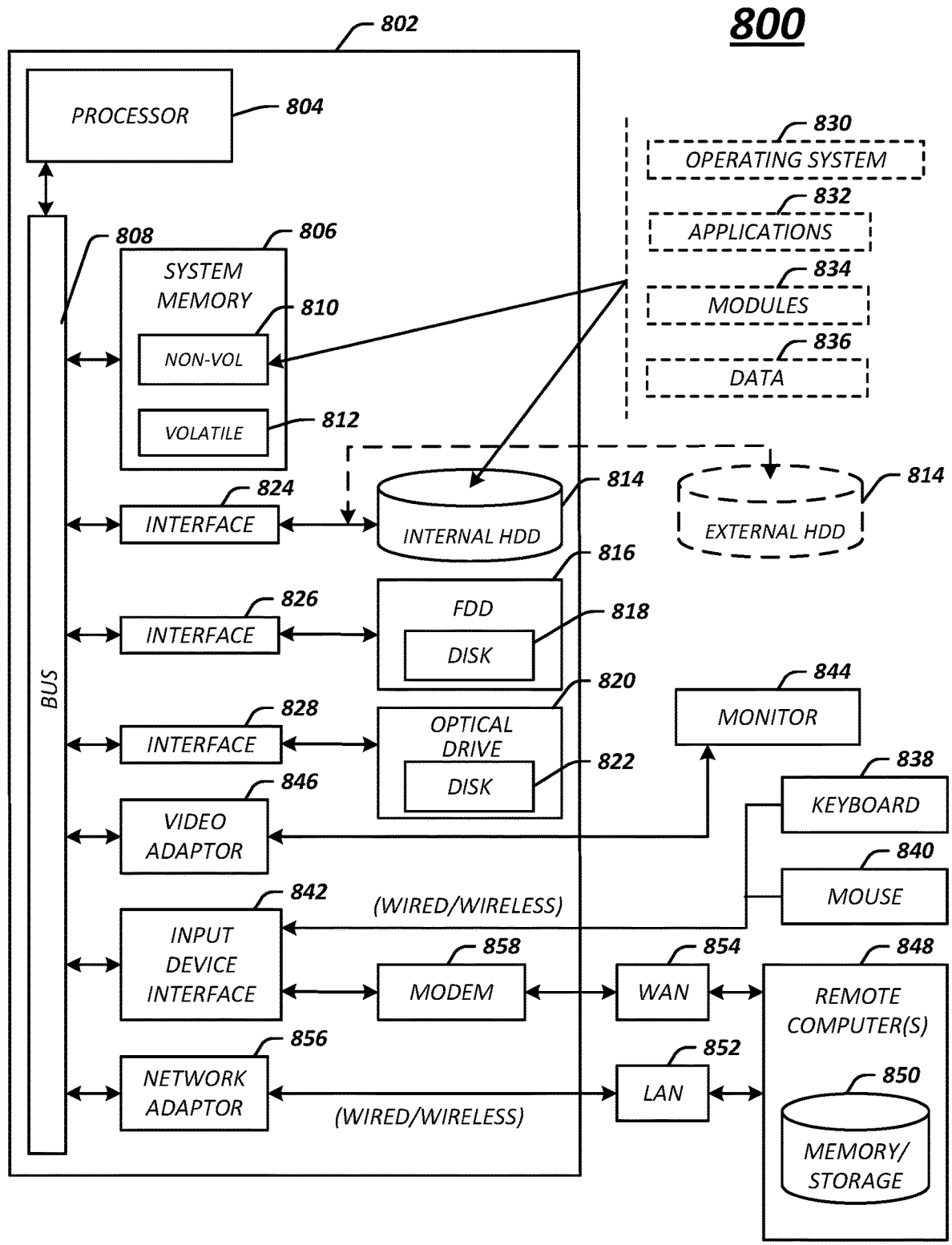
FIG. 8 illustrates an embodiment of a computing architecture.

FIG. 8 illustrates an embodiment of an exemplary computing architecture 800 comprising a computing system 802 that may be suitable for implementing various embodiments as previously described. In various embodiments, the computing architecture 800 may comprise or be implemented as part of an electronic device. In some embodiments, the computing architecture 800 may be representative, for example, of a system that implements one or more components of the system 100. In some embodiments, computing system 802 may be representative, for example, of the stationary devices 101, base stations 105, and sensor devices 109 of the system 100. The embodiments are not limited in this context. More generally, the computing architecture 800 is configured to implement all logic, applications, systems, methods, apparatuses, and functionality described herein with reference to FIGS. 1-7.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 802 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 802.

As shown in FIG. 8, the computing system 802 comprises a processor 804, a system memory 806 and a system bus 808. The processor 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 804.

The system bus 808 provides an interface for system components including, but not limited to, the system memory 806 to the processor 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computing system 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies. The computing system 802 is generally is configured to implement all logic, systems, methods, apparatuses, and functionality described herein with reference to FIGS. 1-7.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100, e.g., the location estimator 106A-C, location data 107A-C, and event data 108.

A user can enter commands and information into the computing system 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computing system 802. In addition to the monitor 844, a computer typically includes other peripheral output devices, such as speakers, printers, and so forth.

The computing system 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computing system 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computing system 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computing system 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computing system 802, or portions thereof, can be stored in the remote memory/storage device 850. It will be appreciated that the network connections shown are exemplary and other means of establishing a communications link between the computers can be used.

The computing system 802 is operable to communicate with wired and wireless devices or entities using the IEEE 802 family of standards, such as wireless devices (e.g., wireless devices 104A-C) operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity.

A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An apparatus, comprising:
   a sensor device comprising a plurality of photosensors;
   one or more processors; and
   a memory storing instructions which when executed by the one or more processors cause the one or more processors to:
   receive, by at least one of the plurality of photosensors, a laser light emitted from at least three light emitting devices of a plurality of light emitting devices;
   determine a location of the sensor device in a space based on a respective time the laser light emitted from the at least three of the plurality of light emitting devices is received by the at least one of the plurality of photosensors and a location of each of the at least three of the plurality of light emitting devices;
   modify the location of the sensor device based on location information received from at least one other device of a plurality of other devices;
   determine an event associated with the modified location of the sensor device and at least one previously determined location of the sensor device in the space; and
   transmit an indication of the event, the modified location in the space, and an object identifier of an object associated with the sensor device to a base station.

2. The apparatus of claim 1, the event comprising one or more of: (i) an arrival of the object associated with the sensor device in the determined location, (ii) a departure of the object associated with the sensor device from the at least one previously determined location of the sensor device, the base station configured to:
   determine a fee associated with the determined event; and
   receive payment of the fee associated with the determined event.

3. The apparatus of claim 1, wherein each light emitting device emits laser light at a respective frequency and encodes a unique identifier of the respective light emitting device in the laser light, the memory further storing instructions which when executed by the one or more processors cause the one or more processors to:
   receive the location information from the plurality of other devices, the location information comprising a unique identifier of a respective object associated with the respective device of the plurality of other devices; and
   determine a location of each of the plurality of other devices relative to the sensor device, wherein the modified location is determined based on the determined location of each of the plurality of other devices relative to the sensor device.

4. The apparatus of claim 3, the plurality of light emitting devices comprising a plurality of stationary light emitting devices and the plurality of other devices, each of the plurality of other devices associated with a respective object of a plurality of objects, the plurality of objects comprising:

(i) vehicles, (ii) containers, (iii) wearable objects, and (iv) items of inventory, the space comprising one or more of: (i) a parking area, (ii) a shipping yard, (iii) a venue, and (iv) a warehouse, a wireless network communicably coupling the plurality of sensor devices and the plurality of other devices.

5. The apparatus of claim 1, further comprising an identification device, the identification device configured to reflect at least a portion of the received laser light to transmit an identifier of the identification device to the plurality of light emitting devices, wherein the indication of the event, the modified location in the space, and the object identifier are transmitted via a Bluetooth mesh network.

6. The apparatus of claim 1, wherein the location of the sensor device in the space is further determined based on a respective distance between the sensor device and each of the at least three of the plurality of light emitting devices, the distances determined based on the respective locations of the at least three of the plurality of light emitting devices and the respective times the laser light emitted from the at least three of the plurality of light emitting devices is received by the at least one photosensor of the plurality of photosensors.

7. The apparatus of claim 1, the memory further storing instructions which when executed by the one or more processors cause the one or more processors to:
 transmit, to the base station: (i) the times the laser lights emitted from at least three of the plurality of light emitting devices was received by the at least one photosensor of the plurality of photosensors, and (ii) a respective unique identifier of the at least three of the plurality of light emitting devices, the base station to determine the location of the sensor device without requiring the sensor device to determine the location of the sensor device.

8. A non-transitory computer-readable storage medium storing computer-readable program code executable by a processor to:
 receive, by a base station, a time a laser light emitted from at least three light emitting devices is received by a photosensor of a sensor device, the photosensor of a plurality of photosensors, the sensor device one of a plurality of sensor devices, each light emitting device of the at least three light emitting devices one of a plurality of light emitting devices;
 determine, by the base station, a location of an object in a space based on the received times and a respective location of each of the at least three of the plurality of light emitting devices, the object associated with the sensor device;
 modify, by the base station, the determined location of the sensor device in the space based on location information received from at least one other device of a plurality of other devices;
 determine, by the base station, an event associated with the modified location of the object and at least one previously determined location of the object in the space; and
 perform, by the base station, an operation associated with the determined event associated with the modified location of the object.

9. The non-transitory computer-readable storage medium of claim 8, each of the plurality of sensor devices associated with a respective object of a plurality of objects, the medium storing computer-readable program code executable by the processor to:
 generate, by the base station, a graphical user interface (GUI) depicting a location of each of the plurality of objects in the space; and
 output the GUI for display.

10. The non-transitory computer-readable storage medium of claim 8, the event comprising one or more of: (i) an arrival of the object associated with the sensor device in the determined location, (ii) a departure of the object associated with the sensor device from the at least one previously determined location of the sensor device, a wireless network communicably coupling the plurality of sensor devices.

11. The non-transitory computer-readable storage medium of claim 10, the operation associated with the event comprising:
 determining a fee associated with the determined event; and
 charging the fee associated with the determined event to an account associated with the object.

12. The non-transitory computer-readable storage medium of claim 8, the plurality of light emitting devices comprising a plurality of stationary light emitting devices and the plurality of sensor devices, each of the plurality of sensor devices associated with a respective object of a plurality of objects, the plurality of objects comprising: (i) vehicles, (ii) containers, (iii) wearable objects, and (iv) items of inventory, the space comprising one or more of: (i) a parking area, (ii) a shipping yard, (iii) a venue, and (iv) a warehouse.

13. The non-transitory computer-readable storage medium of claim 12, storing computer-readable program code executable by the processor to:
 receive data describing a respective location of each of the plurality of stationary light emitting devices; and
 determine the location of the object in space further based on the received data describing the locations of the plurality of stationary light emitting devices and a respective unique identifier encoded in the laser light received by the sensor device.

14. The non-transitory computer-readable storage medium of claim 8, wherein each light emitting device emits laser light at a respective frequency and encodes a unique identifier of the respective light emitting device in the laser light, the medium storing computer-readable program code executable by the processor to:
 receive the location information from the plurality of other devices, the location information comprising a unique identifier of a respective object associated with the respective device of the plurality of other devices; and
 determine a location of each of the plurality of other devices relative to the sensor device, wherein the modified location is determined based on the determined location of each of the plurality of other devices relative to the sensor device.

15. A method, comprising:
 receiving, by a photosensor of a sensor device, a laser light emitted from at least three light emitting devices, each light emitting device of a plurality of light emitting devices, the sensor device one of a plurality of sensor devices;
 determining a location of the sensor device in a space based on a respective time the laser light emitted from the at least three of the plurality of light emitting devices is received by the photosensor and a respective location of each of the at least three of the plurality of light emitting devices;
 modifying the location of the sensor device based on location information received from at least one other sensor device of the plurality of sensor devices;

determining an event associated with the location and at least one previously determined location of the sensor device in the space; and transmitting, by the sensor device, an indication of the event, the modified location in the space, and an object identifier of an object associated with the sensor device to a base station.

16. The method of claim 15, wherein each light emitting device emits laser light at a respective frequency and encodes a unique identifier of the respective light emitting device in the laser light, the plurality of light emitting devices comprising a plurality of stationary light emitting devices and the plurality of sensor devices, each of the plurality of sensor devices associated with a respective object of a plurality of objects, the plurality of objects comprising: (i) vehicles, (ii) containers, (iii) wearable objects, and (iv) items of inventory, the space comprising one or more of: (i) a parking area, (ii) a shipping yard, (iii) a venue, and (iv) a warehouse.

17. The method of claim 16, wherein the location of the sensor device is determined by at least one of: (i) the sensor device, and (ii) the base station, wherein the indication of the event, the location in the space, and the object identifier are transmitted to the base station via at least one other sensor device of the plurality of sensor devices.

18. The method of claim 17, wherein the base station determines the location of the sensor device based on at least one of a respective unique identifier encoded in the laser light and the frequency of the laser light received by the photosensor of the sensor device.

19. The method of claim 18, further comprising:

receiving, by the base station, data describing a respective location of each of the plurality of stationary light emitting devices; and determining, by the base station, the location of the object in space further based on the received data describing the locations of the plurality of stationary light emitting devices.

20. The method of claim 19, further comprising:

receiving, by the base station, an indication of a time a laser light emitted from at least three of the plurality of light emitting devices is received by a photosensor of each of the plurality of sensor devices;

determining, by the base station, a respective location in the space of each of a plurality of objects associated with the plurality of sensor devices based on the received indications and the data describing the locations of the plurality of stationary light emitting devices; and generating, by the base station, a graphical user interface (GUI) depicting a location of each of the plurality of objects in the space; and outputting the GUI for display.

* * * * *